Jan. 20, 1942.  S. A. FOSTER  2,270,728
GRINDING GAUGE
Filed May 3, 1940
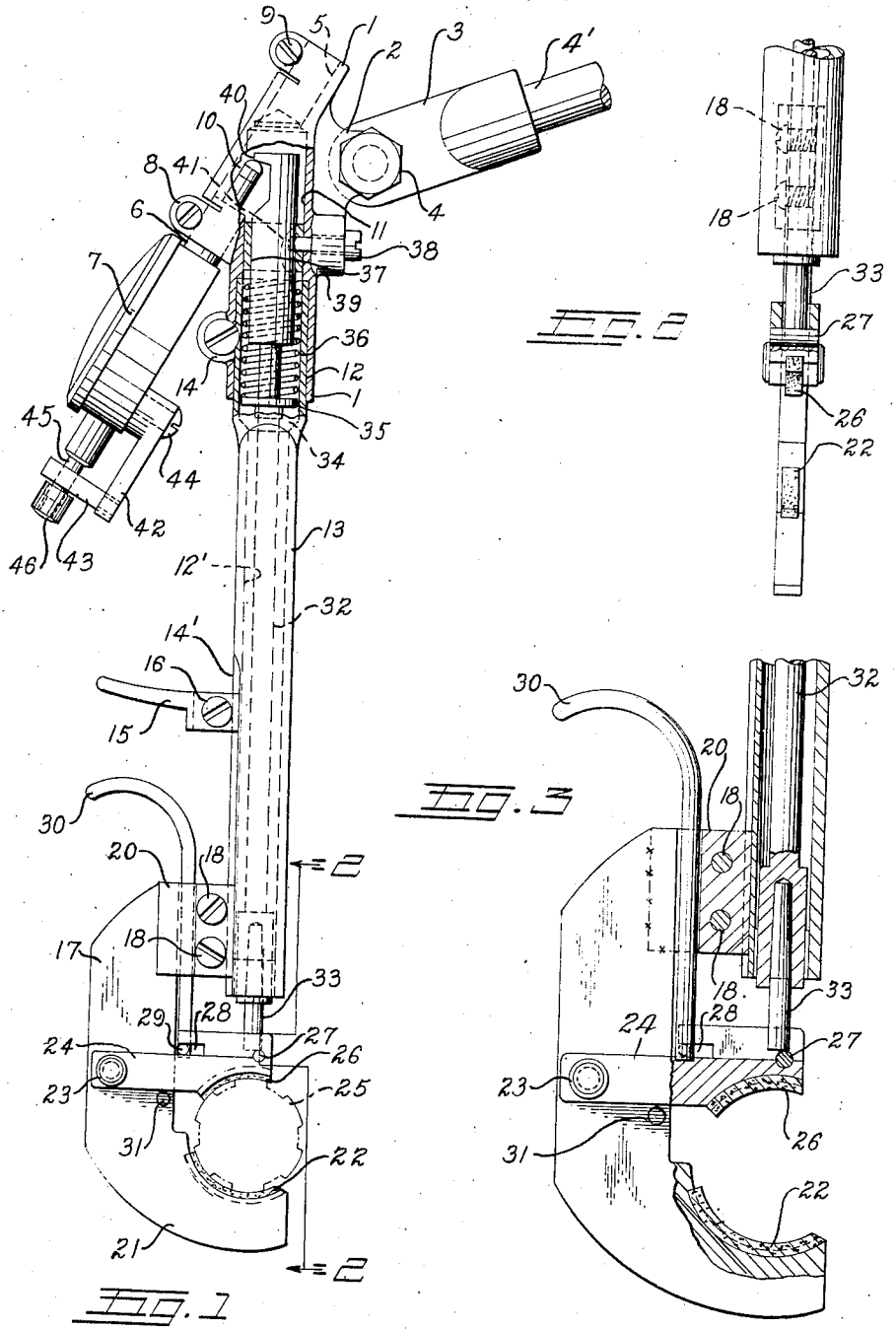
INVENTOR.
Shubel A. Foster.

Patented Jan. 20, 1942

2,270,728

UNITED STATES PATENT OFFICE 2,270,728

GRINDING GAUGE

Shubel A. Foster, Ferndale, Mich.

Application May 3, 1940, Serial No. 333,213

3 Claims. (Cl. 33—148)

This invention relates to gauges of the type adapted to be in continuous service during reduction in diameter as in a grinding operation of either continuous or interrupted surfaces of revolution.

Heretofore in grinding interrupted conical or cylindrical surfaces of revolution, such as that of splined journals or shafts, it has been necessary for the grinding machine operator to partially or fully stop the machine repeatedly in order to gauge the diameter of the work piece to determine the progress of the grinding operation, because it has not heretofore been practical to caliper an interrupted surface of revolution on a rotating work piece.

To gauge such a work piece accurately, while rotating, it is necessary that the gauging surfaces be of such area that the surface interruptions of the work piece are spanned and that said areas be of such a contour that the maximum diameters of the work passing in contact against those areas may do so smoothly enough that the indicating points are not subject to such violent movement that the human eye cannot follow said movement without fatigue or physical discomfort.

The object of this invention is to provide a mechanism that will readily and accurately gauge a continuous or interrupted surface of revolution in sustained relation to the work piece during reduction in diameter in the grinding operation and provide a very accurate indication of the diameter being gauged at completion.

Another object of this invention is to provide a mechanism of such ruggedness of design and inherent construction that the gauging surfaces can be set in predetermined relation and accurately finished to a predetermined contour in place in the partly assembled device.

Another object of this invention is to provide a gauge with gauging surfaces of contours so shaped and disposed that wear on the surfaces indicating completed size of the work piece is reduced to an extremely low value.

A further object of this invention is to provide a gauge adapted to check the progress of the grinding operation and final size of the work pieces without violent movement of the indicator finger and undue wear on the indicator mechanism.

My invention, from a structural standpoint, may be characterized in the following particulars in which reference will now be had to the accompanying drawing:

Figure 1 is a side elevation of the device as projected against a plane perpendicular to the axis of the work piece, and partially broken away and sectioned to show the internal construction thereof;

Figure 2 is a view of the calipering members from the lower portion of Fig. 1, as indicated by the line 2—2; and Figure 3 is an enlarged side elevation of the lower portion of Fig. 1, showing the details of the calipering mechanism partly in section.

Referring more specifically to Figure 1 of the drawing, my improved gauging device comprises primarily a body 1 having a projecting lug 2 bearing against the yieldable suspension member 3 to which it is pivotally attached by the pivot bolt 4. The suspension member 3 is mounted on the end of a suitable arm or staff 4' extending from a tiltable socket or articulated support (not shown) which is normally mounted on the machine holding and processing the work piece, and so arranged that the entire device can be quickly put in service while the work piece is rotating as will be readily understood, or it may be suspended in a non-operative position at will. The body member 1 has a bore 5 adapted to receive the mounting stem 6 of a dial indicator 7. A pair of spaced lugs extended laterally from the body at the lower end of the bore 5 and these can be securely clamped by the clamping screw 8 to hold the indicator in one position extending downwardly toward the left. Alternately the indicator 7 may be placed at the other end of bore 5 where it may be similarly clamped by the clamping screw 9.

Assuming that the indicator will be positioned as shown in Fig. 1 the plunger 10 of the dial indicator will be movable longitudinally in the bore 5 and the normal unrestrained position of said plunger 10 will be extended to engage in the transverse recess 40 in the uppermost end of a gauge rod 32. Another bore 11 in body 1 with an enlarged diameter 12 has its axis passing or intersecting approximately through the center of bore 5. In the enlarged diameter 12 is fitted a tubular connector or coupling member 13 which is clamped in place by a clamping screw 14. The tubular coupling member 13 has a pair of mating longitudinal dovetail recesses 14' machined on one side to which is clamped an adjustable thumb rest 15 with clamp screw 16, and also a caliper body 17 by means of the screws 18 which clamp the mating arms 20 of the caliper body 17 which are adapted to grip firmly into the dovetail recesses of the tubular coupling member 13. Caliper body 17 has a lower portion a jaw 21 which has a concave work-engaging surface and extends under the work piece 25. The lower jaw 21 is so machined as to form a seat for the proper attachment of a wear resistant shoe presenting a caliper surface 22 shown attached thereto.

The inwardly curved or concave surfaces of the jaws are of a substantially cylindrical conformation generated about a center which, in one predetermined position of the jaws is a common center to both surfaces and to the work being calipered, as shown in Figure 1. Near the center of the caliper body 17 is a pivot screw 23, threaded into the said body 17, upon which is rotatably mounted a movable caliper jaw 24 which has a concave work-engaging surface turned toward the other jaw. This concave surface of the jaw 24 is machined for the reception and attachment of a removable wear resistant calipering surface 26. The movable caliper arm 24 is further provided with a slot 28 for receiving a pin 29 extending laterally from the lower end of a finger lifting trigger 30. This trigger member 30 is provided for lifting the movable caliper arm 24 in order to insert a standardized test piece or place the device on the work piece in operation, and it passes freely upward between clamping arms 20. A stop pin 31 is provided in the caliper body 17 to engage one side of the pivoted caliper arm 24 to limit the closure of the calipering members beyond a convenient or desirable value.

In the bore of the tubular coupling member 13 the loosely fitting gauge rod 32 is adapted to move longitudinally in the bore and the lower end of the said gauge rod is a tapered socket for the reception of the taper shanked wear point 33. Said wear point 33 has a flat end which normally rides on a pin 27. The upper end of plunger body 32 is enlarged to provide a shoulder 34 above which is a portion 35 enlarged to loosely fit the plunger 32 to act as a seat for the spring 36. It is obvious that in case it is more convenient to make the gauge rod 32 of a number of pieces the enlarged portion could be replaced by a washer of suitable dimensions. The said enlarged portion 35 is loaded by yieldable means, in this case a spiral spring 36, the upper end of which bears against the tubular spring retainer 37 which in turn is held in place in the bore 11 in body 1 by the screw 38 passing through the internally threaded boss 39 in body 1. On the upper end of the gauge rod 32 is a second enlarged portion having a milled keyway 41 into which is loosely fitted the end of screw 38. The said end of screw 38 is machined to a diameter reduced from the thread diameter so that it presents a smooth surface to the sides and ends of the milled keyway 41. It will be apparent that the gauge rod 32 is limited against movement except through an extremely small angular displacement and longitudinally as may be desirable or as may be determined by the length of said keyway 41. The upper end of the gauge rod is further provided with a transverse recess 40 so proportioned as to admit the plunger 10 of the dial indicator so that the end of said plunger 10 may bear against the upper side of said transverse recess 40.

It will be apparent that the gauge rod 32 within certain limits will bear against the plunger 10 of the dial indicator 7 at the upper surface of the transverse recess and through the pin 27 on the movable caliper arm 24 at the lower end under the pressure of the yieldable spring 36. In this arrangement the movable caliper body 24 is adapted to clamp the work piece 25 in such a manner that the diameter of the work piece will register correspondingly on the dial indicator 7.

It is notable that the dial indicator 7 is fitted by means of screw 44 with a mounting member 42 equipped with a pair of flat tension members 43 bearing on approximately opposite sides of the indicator plunger extension 45. The function of these tension members is to retain the plunger in the position indicating the smallest diameter perceivable by the gauge and prevent chattering of the indicator plunger in the transverse recess 40 as plunger 32 rises in response to movement of the movable caliper member 24. The cap 46 serves as a thumb button for returning the plunger to the initial point at the start of the grinding operation.

The method of use of the device consists normally in opening the calipering members by means of manual pressure of the trigger 30 toward the thumb rest 15 and placing the lower caliper surface in such relation to the grinding machine that said lower caliper surface bears against the lower side while the movable caliper member bears against the upper side of the work. Then the operator presses the cap 46 of the indicator plunger so that the said plunger 41 bears against the upper wall of the transverse recess 40 in the upper end of the gauge rod 32. As the operation proceeds the entire mechanism is lifted by the yieldable suspension (not shown) so that the lower shoe 22 of the caliper jaw 21 bears against the lower side of the work, the spring 36 forces the gauge rod and in turn the wear point 33, pin 27, movable caliper jaw 24 and its shoe 26 downwards towards the upper side of the work. The surface of the transverse recess bears against the indicator plunger 41 registering the movement to the predetermined value.

It is to be noted that the caliper surfaces 22 and 26 may be set in a predetermined relation and accurately finished to the correct radius to gauge a predetermined size. Under these conditions when the grinding operation is started on an oversize piece the movable caliper member 24 bears on the work not directly under the gauge rod 32 but much nearer to the pivot 23 until the piece is actually at size, at which time the bearing approaches a position under the gauge rod or will lie in a line passing through the center of the work and the point coinciding with the center of pivot bolt 4. This is an advantage which minimises the wear on the caliper surfaces and helps to maintain adjustment. The surfaces of the caliper faces 22 and 26 are normally finished to a little larger radius than the finished diameter of the work piece. With the proper tension in the yieldable suspension the flat tension members and the spring 36, the plunger of the indicator moves to the position registering completion of the work with entire absence of chatter.

The drawing accompanying this specification follows the device very closely as it is being produced for actual use, yet I desire it to be understood that the structural elements are susceptible to changes in detail of manufacture and assembly without departing from the spirit and intent of the invention.

What I claim is:

1. In a grinding gauge for cylindrical work, the combination of a caliper body having an integral work-engaging jaw projecting therefrom, a swingable work-engaging jaw hingedly projecting from said body in spaced relation from the first mentioned jaw, a tubular connector secured at one end to said caliper body, a transverse contact bearing on the outside of the movable jaw, a gauge rod axially movable in said connector and having a flat ended portion engaging said transverse contact bearing, resilient means continuously urging said gauge rod against said pin, to urge the swingable jaw toward the work, and mounting means on the remote end of said connector for mounting a conventional measuring indicator having a pressure-sensitive plunger in such position that said plunger will be operatively engaged by the remote end of said gauge rod to indicate the size of the work piece.

2. In a grinding gauge for calipering cylindrical work having surface indentions, in combination, a pair of calipering jaw members, one of which is constantly urged toward the other, an indicator having a plunger actuated from the movable jaw member to indicate minimum calipered diameter of said work, and a friction brake engaging said indicator plunger to prevent reflex movements thereof as inequalities in said work pass beneath said calipering jaw members, whereby reversing fluctuations of the indicator are minimized and minimum calipered diameter of said work is continuously registered by said indicator.

3. In a grinding gauge for calipering cylindrical work having surface indentations, the combination of two calipering jaw members, means pivotally hinging one of said jaw members on the other for relatively swinging in spaced relation, resilient means for constantly urging the pivoted jaw member against the work, and indicator having a pressure-sensitive plunger responsive to closing movements of said pivoted jaw member, and a friction brake engaging said indicator plunger to prevent reflex movement thereof and thereby ensure said indicator at all times registering the maximum closing movement of said pivoted jaw.

SHUBEL A. FOSTER.